United States Patent [19]

Takemura

[11] Patent Number: 4,893,192
[45] Date of Patent: Jan. 9, 1989

[54] VIDEO SIGNAL DROP-OUT CORRECTOR CIRCUIT RESPONSIVE TO LEVEL OF LUMINANCE COMPONENT OF THE SIGNAL

[75] Inventor: Shinichi Takemura, Saitama, Japan
[73] Assignee: Pioneer Electronic Corporation, Tokyo, Japan
[21] Appl. No.: 169,254
[22] Filed: Mar. 16, 1988
[30] Foreign Application Priority Data

Mar. 17, 1987 [JP] Japan .................. 62-39443[U]

[51] Int. Cl.$^4$ ............................................. H04N 5/94
[52] U.S. Cl. ................................................ 358/336
[58] Field of Search ............... 358/314, 336; 360/38.1

[56] References Cited

U.S. PATENT DOCUMENTS 3,366,732  1/1968  Holmberg .
4,006,295  2/1977  Oprandi et al. .
4,199,780  4/1980  Taylor .
4,591,898  5/1986  De Boer et al. ................ 358/314 X
4,623,994  11/1986  Nabeshima et al. ........... 360/38.1 X

FOREIGN PATENT DOCUMENTS 2316809  4/1976  France .
5765968  2/1980  Japan .
1551070  9/1979  United Kingdom .

Primary Examiner—Robert L. Richardson
Attorney, Agent, or Firm—Sughrue, Mion, Zinn, Macpeak & Seas

[57] ABSTRACT

A drop-out corrector circuit for video signals read from a recording medium such as a video disk or the like. Predetermined components, specifically envelope components, are detected in the high-frequency signal read from the disk including the video signal. The output level of the detection signal thus produced is compared with a reference level, and a drop-out detection signal is produced as the result of this comparison.

3 Claims, 2 Drawing Sheets

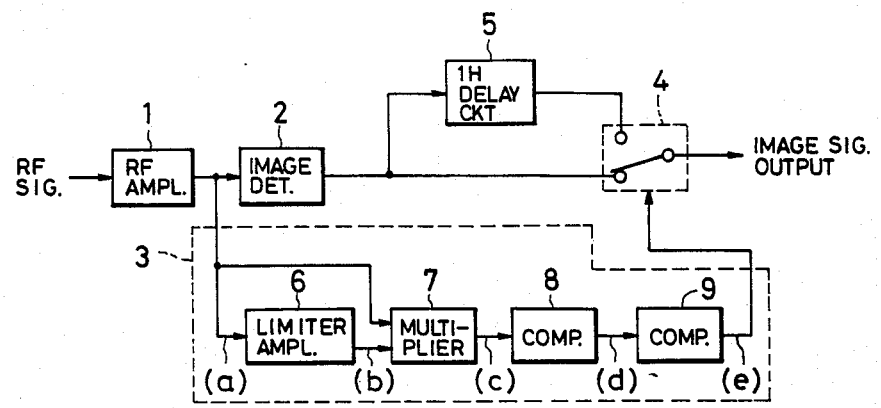
FIG. 1 PRIOR ART
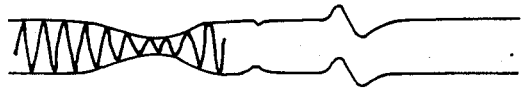
FIG. 2A
FIG. 2B
FIG. 2C
FIG. 2D
FIG. 2E
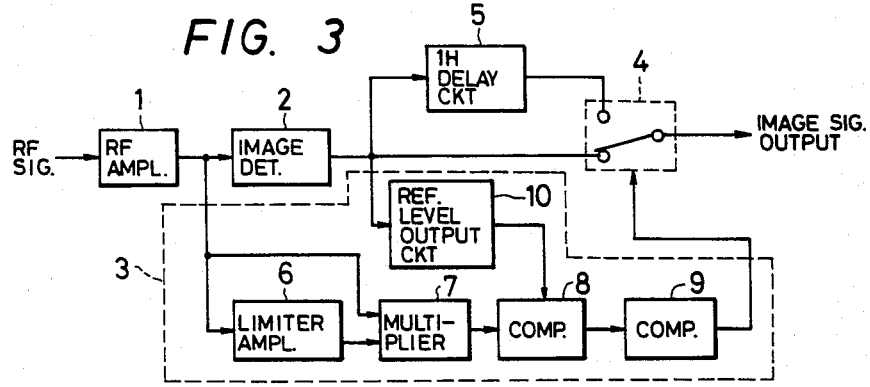
FIG. 3

VIDEO SIGNAL DROP-OUT CORRECTOR CIRCUIT RESPONSIVE TO LEVEL OF LUMINANCE COMPONENT OF THE SIGNAL

BACKGROUND OF THE INVENTION

The present device relates to a drop-out corrector circuit for video signals.

A drop-out corrector circuit is essential for detecting and correcting for drop-outs caused by dirt or damage to a recording medium in a playback device which reads a data signal from a recording medium such as a video disk.

An example of a conventional drop-out corrector circuit is shown in FIG. 1. In this drop-out corrector circuit, the RF (high-frequency) signal (FIG. 2A) forming the read-out signal from a recording disk is amplified by an RF amplifier 1 and supplied to an video demodulator 2 and to a drop-out detector 3. The video demodulator 2 is composed of an FM demodulator or the like, which outputs a color video signal extracted from the RF signal. This video signal is supplied to one of the terminals of switch 4 directly and to its other terminal via a 1H (horizontal synchronous period) delay circuit 5. In the drop-out detector 3, the amplitude of the RF signal is limited by a limiter amp 6, thus converting the signal to a pulse train signal, as shown in FIG. 2B. This pulse train signal is multiplied with the RF signal by a multiplier 7, and as the result is output as an RF signal with envelope elements, as shown in FIG. 2C, to a comparator 8. A reference signal is also supplied to the comparator 8. If the level of the signal with envelope elements is lower than the reference level, the output level of the comparator 8 immediately drops from a high to a low level. If the level of the envelope signal is higher than the reference level, the output level of the comparator 8 gradually changes with a specified time constant from a low to a high level. The output signal of the comparator 8 (FIG. 2D) is fed to another comparator 9 where it is compared with the reference level of the comparator 9. The low level output of comparator 9 (FIG. 2E) is fed to the activating terminal of the switch 4 as a drop-out detector pulse.

In the absence of a drop-out detector pulse, the switch 4 outputs the video signal from the video demodulator 2, but when a drop-out detector pulse is present, it outputs the 1H delayed video signal from the delay circuit 5.

With such a conventional drop-out corrector circuit, the reference level of the comparator 8 is preset at a fixed level. To improve the sensitivity of the drop-out detector in order to handle brief drop-outs with little fluctuation, it is sufficient to set the reference level of the comparator 8 at a higher level. However, if the sensitivity is raised too much, the comparator will pick up other elements in the RF signal as well as drop-outs, with the result that repeated switching of the video signal occurs at the switch 4, and hence the video signal is over-corrected, leading to the adverse effects such as flicker and distortion of the image of the screen. This is particularly evident with brighter images. Nonetheless, it is necessary to raise the sensitivity to the level of over-correction in order to detect brief drop-outs, since if the sensitivity is too low, the inadequate correction for brief drop-outs becomes a problem, especially with darker images.

SUMMARY OF THE INVENTION

Thus, an object of the invention is to provide a drop-out corrector circuit that, while preventing deterioration of the image, has a relatively high degree of detection sensitivity with respect to brief drop-outs.

The drop-out corrector circuit of the invention includes detection means for detecting specific elements of high-frequency signals including video signals, and comparator means which compares the output level the detector means with a reference level and produces a drop-out detection pulse in response to the results of this comparison. The circuit is characterized in that the comparator means sets the reference level according to the luminous element level of the video signal.

BRIEF DESCRIPTION OF THE DRAWINGS

FIG. 1 is a block diagram illustrating a drop-out corrector circuit of the prior art;

FIGS. 2A-2E are waveform diagrams illustrating the function of various circuits in FIG. 1;

FIG. 3 is a block diagram illustrating a preferred embodiment of the device;

DESCRIPTION OF THE PREFERRED EMBODIMENTS

A preferred embodiment of the invention will now be described with reference to FIGS. 3 and 4.

Figure 5:
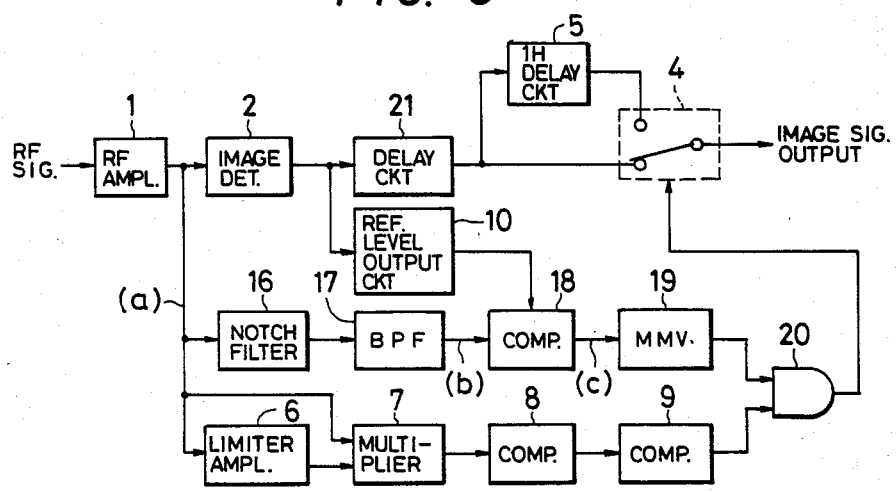
FIG. 5 is a block diagram illustrating another embodiment of the invention.

In FIG. 2, elements identical to those of the drop-out corrector circuit shown in FIG. 5 are labelled with the same numbers.

In the preferred embodiment, the color video signal output from the video demodulator 2 is supplied to switch 4 and delay circuit 5, and also to a reference level signal generator circuit 10.

Figure 4:
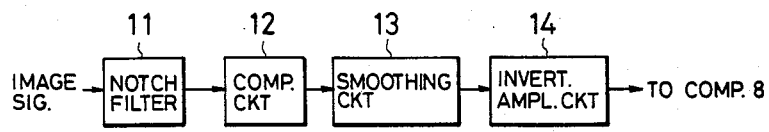
FIG. 4 is a block diagram showing the specific composition of a reference level signal generating circuit in FIG. 3.

The reference level signal generator circuit 10, as shown in FIG. 4, is composed of a notch filter 11 which removes the color subcarrier component from the color video signal and selects the brightness component, a clamping circuit 12 which shifts the output voltage of the notch filter 11 by a fixed level in a positive direction, a smoothing circuit 13 which smoothes the output voltage of clamping circuit 12, and an inverting amplifier circuit 14 which inverts and amplifies the output voltage from smoothing circuit 13. The output voltage from the inverting amplifier circuit 14 is fed to the comparator 8 as the reference level signal.

The remainder of the device is constituted as shown in FIG. 1, and will thus not be explained in further detail. However, it may be noted that the output voltage from the inverting amplifier circuit 14 may be split using a voltage divider before being fed to the comparator 8.

In the above arrangement the luminance component of the color video signal output from the video demodulator 2 is separated out by notch filter 11, and by passing the output of the notch filter 11 through the clamping circuit 12 and smoothing circuit 13, a continuously varying luminance signal is obtained. Since the level of the luminance signal increases with the brightness of the screen image, inverse amplification of the output of the smoothing circuit 13 by the inverting amplifier circuit 14 provides a falling voltage, i.e., reference level, from the amplifier circuit 14 with increasing luminous element level. Thus as the luminous element level increases, the reference level drops, and thus the output voltage of the multiplier 7 during brief drop-outs with little level fluctuation becomes greater than the reference level. As a result, there is no low level output from the comparator 8 and the drop-out detection sensitivity decreases. When the luminous element level decreases, the reference level increases, and thus the output of the multiplier 7 during brief drop-outs with little fluctuation is lower than the reference level. As a result, a low level output from the comparator 8 is generated, a drop-out detector pulse is produced, and the drop-out detection sensitivity increases.

By employing an adjustable time constant for the smoothing circuit 13, it is possible to provide a reference level corresponding to the brightness of each frame when the time constant is large, and when it is small a reference level corresponding to the average luminous element level of one horizontal synchronous period can be obtained.

Figure 6A:
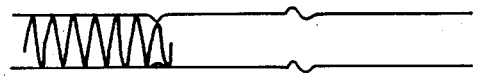
FIGS. 6A-6C, are waveform diagrams illustrating the function of various circuits in FIG. 5.
Figure 6B:
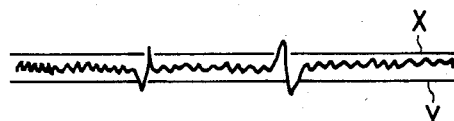
Figure 6C:
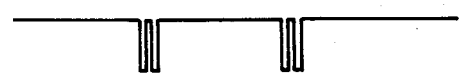

FIG. 5 shows another embodiment of the present invention. By passing the RF signal output from an RF amplifier (FIG. 6A) through a notch filter 16 which removes the sound carrier, and a BPF (bandpass filter) 17 which lets pass input signals of, for example, 1-2MHz, components of a specific frequency can be separated out from the RF signal, as shown in FIG. 6B. The level of the specific frequency components is then compared in a window-comparator 18 with the output level of a reference level signal generator circuit 10. The reference level signal generator circuit 10 produces positive and negative reference signals X and Y, whereby the range between the positive and negative reference levels increases with luminous element level. When the level of the specific frequency components is beyond the range of the reference positive and negative levels, the output level of the comparator 18 drops to a low level as shown in FIG. 6C, which low level causes a MMV (monostable multivibrator) 19 to emit low level drop-out detector pulses at specified intervals. An AND gate 20 feeds drop-out detector pulses from the MMV 19 and from the comparator 9 to the switch 4. The device is thus arranged so that the notch filter 16, BPF 17, comparator 18 and MMV 19 function as a brief drop-out detector circuit whose detection sensitivity varies with the luminous element level of the video signal, and the limiter amplifier 6, multiplier 7, and comparators 8 and 9 function as a circuit of fixed sensitivity for detecting relatively longer drop-outs. The delay circuit 21 is inserted in the video signal line to correct for the signal delay to the AND gate 20.

As explained above, in the drop-out corrector circuit of the present invention, the reference level is set according to the luminous element level of the video signal, and since drop-out is detected by comparing the level of specific components of the high-frequency signal with the reference level, the drop-out detection sensitivity decreases with increasing image brightness, thus preventing such undesirable effects of overcompensation is flicker and distortion which stand out in bright images. At the same time, since the drop-out detection sensitivity increases with a reduction in image brightness, the device is able to accurately detect brief drop-outs and thus prevent image distortion and the like caused by brief drop-outs. It is thus able to provide more appropriate drop-out correction.

What is claimed is:

1. A drop-out corrector circuit for video signals comprising: detecting means for detecting specific predetermined components of high-frequency signals including said video signals; comparator means for comparing the output level of said detector means with a reference level and producing a drop-out detection pulse in response to the results of the comparison; and means for varying said reference level according to the level of a luminance signal component of said video signals.

2. The drop-out corrector circuit as claimed in claim 1, wherein said detector means comprises means for detecting envelope components in said high-frequency signals.

3. The drop-out corrector circuit as claimed in claim 1, wherein said detector means comprises means for detecting specific predetermined frequency components in said high-frequency signals.

* * * * *